United States Patent [19]
Edwards et al.

[11] Patent Number: 5,984,360
[45] Date of Patent: Nov. 16, 1999

[54] FURNITURE SLIDE AND METHOD OF USE

[76] Inventors: Donald Jay Edwards, P.O. Box 7., Larimer, Pa. 15647; Donald V Edwards, 28 Government Rd. Rd.11, Irwin, Pa. 15642

[21] Appl. No.: 08/253,721

[22] Filed: Jun. 3, 1994

[51] Int. Cl.⁶ .................................................... B26B 15/00
[52] U.S. Cl. .............................. 280/845; 15/247; 280/19; 280/28.17
[58] Field of Search .................................... 280/845, 205, 280/842, 11.18, 7.12, 8, 18, 18.1, 19, 23.1, 28.12, 28.17, 28.5, 5.24, 47.34, 811; 472/88, 89; D34/28, 38; 15/247

[56] References Cited

U.S. PATENT DOCUMENTS

| | | | |
|---|---|---|---|
| 3,169,652 | 2/1965 | Ewell | 280/28.17 |
| 3,394,944 | 7/1968 | Lowes | 280/845 |
| 3,938,570 | 2/1976 | Stewart | 15/247 |
| 4,735,423 | 4/1988 | Foss | 280/845 |
| 5,177,831 | 1/1993 | Wirth | 15/247 |
| 5,249,321 | 10/1993 | Graf | 280/845 |
| 5,407,217 | 4/1995 | Lambert et al. | 280/8 |

FOREIGN PATENT DOCUMENTS

| | | | |
|---|---|---|---|
| 2449460 | 10/1980 | France | 472/88 |
| 0218204 | 10/1985 | Japan | 280/28.17 |

*Primary Examiner*—Anne Marie Boehler
*Attorney, Agent, or Firm*—Carothers & Carothers

[57] ABSTRACT

A furniture slide for placement between an object to be moved and the flooring over which it is to be moved. The slide is formed of an elongate sheet of flexible material having opposing ends and side walls joining said opposing ends when viewed in plan. The sheet has opposing faces when viewed in side with one of the faces for abutting support and sliding contact with a floor surface and the other face having a compressible material fixed thereon for an abutting support contact with an object to be moved. A hole and grommet are formed on one or both ends of the sheet of material for applying force for movement of the slide. Preferably, the ends of the slide are substantially arcuate in configuration from side wall to side wall. The sheet of material preferably comprises a plastic material, preferably high density polyethylene material, and said compressible material comprises a rubber material. The invention further discloses a method of moving furniture which comprises placing a sheet of material having a reduced friction surface and a friction engaging surface between a portion of the furniture to be moved and the floor over which it will be moved, with the frictional surface engaging the furniture and the reduced friction surface engaging the floor. A second sheet of the same material is then placed under a second portion of the furniture. Force is then applied to the sheet of material to move the furniture.

13 Claims, 5 Drawing Sheets

FURNITURE SLIDE AND METHOD OF USE

BACKGROUND OF THE INVENTION

The invention has to do with furniture slides for efficiently moving heavy objects across floors of buildings. This invention is especially concerned with furniture slides that may be used in co-operation with one another for the movement of furniture across all floor surfaces including rugged areas.

In the moving industry it is quite usual to face the situation of having to move large, heavy, and sometimes awkwardly shaped furniture within the confines of buildings. The preferable method of moving the heavy objects is for the movers to pick the object up and carry it by hand, but this is not always an economically feasible or preferable arrangement. With the exception of moving the furniture through doorways and up and down stairways, or where special orientation of heavy or awkwardly shaped furniture requires lifting, it has been found that placing a separate slide under the object to be moved, and over the surface which it is to be moved it would be quite beneficial so the article may then be slid across the horizontal surfaces which it must traverse in order to be relocated or moved within the confines of the building.

Various prior art devices have been suggested for placing under the legs of furniture or placing under the furniture itself in order that the furniture may be moved across a floor surface. The prior art devices, however, do not take in consideration all of the problems that are associated with moving a heavy furniture object across a flooring surface such as a rugged surface. One of the problems that exist is that the surface sliding across the rug must be a type of material that provides minimal friction between the rug and the sliding surface, while the upper part of the slide that meets with the furniture object must provide sufficient frictional contact with the furniture.

Further problems with furniture slides involve furniture slides catching upon the rugged surface on which it slides, causing the slides to come out from underneath the furniture object being moved. The additional prior art devices, while solving some of the problems do not specifically provide for a method of exerting a force on the furniture slide itself for movement, instead of the furniture, which can have a negative effect on the furniture to be moved. Some of the prior art devices, while providing the furniture slides under the legs of furniture, require that the force to move the furniture be exerted upon the furniture itself either by a pushing or a pulling force. Such a method can introduce stresses and strains on the furniture object which may cause damage to the furniture during movement.

OBJECTS OF THE INVENTION

It is an object of the present invention to provide a furniture slide for the efficient moving of furniture over floored areas.

It is an object of the present invention to provide a means for moving furniture over floored areas.

It is an object of the present invention to provide a safe and easy method of moving furniture across floored areas.

It is an object of the present invention to provide a means for sliding furniture over floored areas.

It is an object of the present invention to provide a means for pulling or pushing furniture across floored areas.

It is an object of the present invention to provide a means for both pulling and sliding furniture across floored areas.

It is a still further object of the present invention to provide sets of individual furniture slides to work co-operatively with one another to move furniture across floored areas.

It is a still further object of the present invention to provide a furniture slide that may be moved over carpeted surfaces without snagging.

BRIEF SUMMARY OF THE INVENTION

According to the present invention there is provided a slide for placement between an object to be moved and the flooring over which it is to be moved. The slide comprises an elongate sheet of flexible material having opposing ends and side walls joining said opposing ends when viewed in plan. The sheet has opposing faces when viewed in side, with one of the faces for abutting support and sliding contact with a floor surface, and the other face having a compressible material approximately ½ inches thick, and preferably a minimum of ½ inch thick, fixed thereon for abutting and supporting contact with an object to be moved. Preferably the compressible material is a rubber material and most preferably a closed foam construction material with a hardness greater than 75 durometers on the shore 00 scale. There are means formed on the elongate sheet of material for applying force for movement of the object and the slide.

Preferably the ends are substantially arcuate in configuration from side wall to side wall and the sheet of material comprises a plastic material and more preferably a high density polyethylene material.

Preferably the sheet of flexible material will have a substantial arcuate configuration in cross section when viewed from end view that forms a concave configuration toward said furniture to be moved.

Preferably the means for applying force to the slide comprises perforations formed in the ends of the sheet of flexible material and grommets re-enforcing said perforations.

The invention further contemplates the method of moving furniture which comprises placing a sheet of material having a reduced friction surface and a friction engaging surface between a portion of the furniture to be moved and the floor over which it will be moved. The sheet of material is positioned with the frictional surface engaging the furniture and the reduced friction surface engaging the floor. A second and similar sheet of material is then placed under a second portion of said furniture and force is then applied to the sheet of material to move the furniture.

BRIEF DESCRIPTION OF DRAWINGS

FIG. 14 is a perspective view of the alternate embodiment of the present invention.

DETAILED DESCRIPTION OF DRAWINGS

Figure 1:
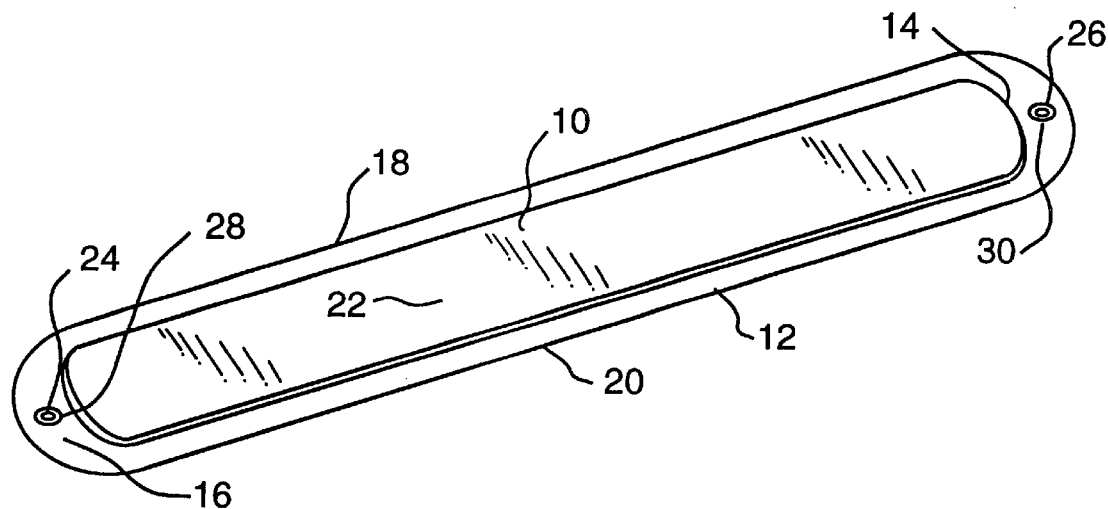
FIG. 1 shows a perspective view of a furniture slide according to the present invention.

What is shown in FIG. 1 is a furniture slide 10 having elongate flexible body 12 with opposing ends 14 and 16 on body 12. Sidewalls 18 and 20 join the opposing ends 14 and 16. Located on the flexible body of material 12 is a compressible material 22 upon which the furniture or object to be moved will be supported. The opposing ends 14 and 16 each have a perforation 24 and 26 respectively formed therein so that a rope or other pulling mechanism may be fitted through the perforations 24 and 26 in order to move the furniture slide when it is located between the piece of furniture or object (not shown) and the flooring area (also not shown). Preferably grommets 28 and 30 reinforce the perforations 24 and 26 so that the flexible material 12 will not be torn during the moving operation. Preferable the length of the flexible body 12 is 48 inches long and 6½ inches wide.

Figure 2:
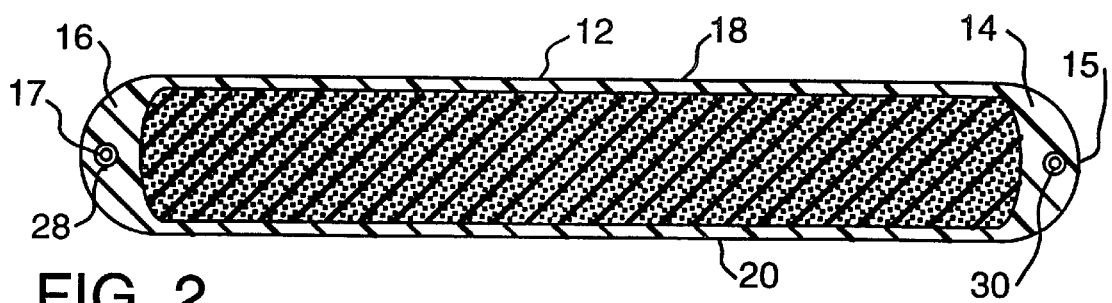
FIG. 2 shows a plan view of a furniture slide with a top face of furniture slide according to the present invention.

Shown more clearly in FIG. 2 is the elongate body 12 having the opposing ends 14 and 16 with the grommet materials 28 and 30 shown more clearly therein. The ends 14 and 16 are preferably formed in arcuate sections such as at 15 and 17 so that the arcuate sections join the sidewalls 18 and 20 of the furniture slide 10.

Figure 3:
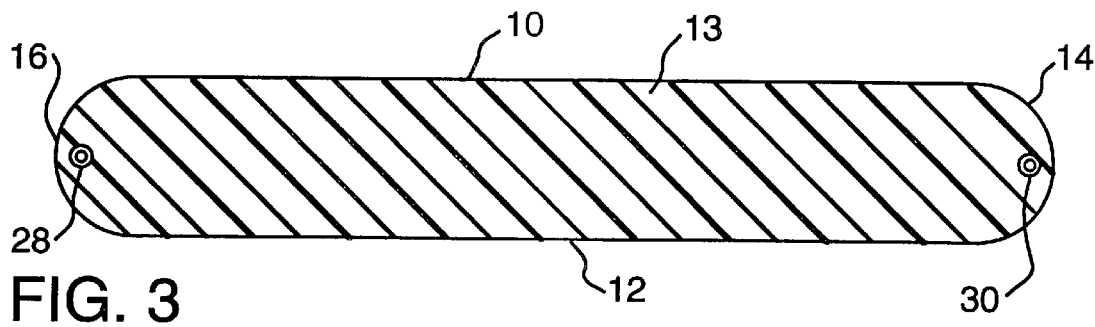
FIG. 3 shows a plan view of the bottom face of the furniture slide according to the present invention.

Shown in FIG. 3 is the furniture slide 10 with the ends 14 an 16 showing the grommets 28 and 30 that extend through perforations 24 and 26 shown in FIG. 1. As has been stated earlier the material 12 is a flexible material and has a bottom face 13 which is facing outwardly of the page and is adapted to abut and slide along a floor surface.

Figure 4:
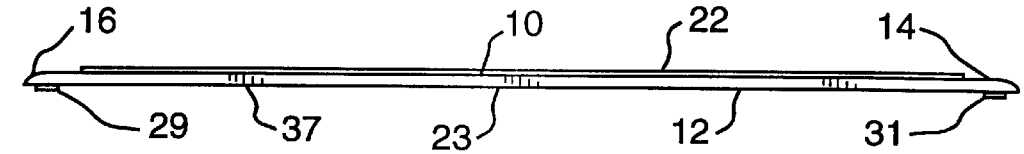
FIG. 4 shows a side view of the furniture slide in FIGS. 1 and 2.

Shown even more clearly in FIG. 4 is the furniture slide 10 having the underlying flexible material 12 supporting the compressible material 22. The compressible material 22 extends throughout the intermediate section 23 of the body of material 12 and stops just short of the opposing ends 14 and 16. The bottom of the grommets 29 and 31 are shown extending below the lower most face 37 of the furniture slide 10 and the grommets will be rounded in such a fashion that they will not catch on any carpet or other material over which they may be sliding.

Figure 5:
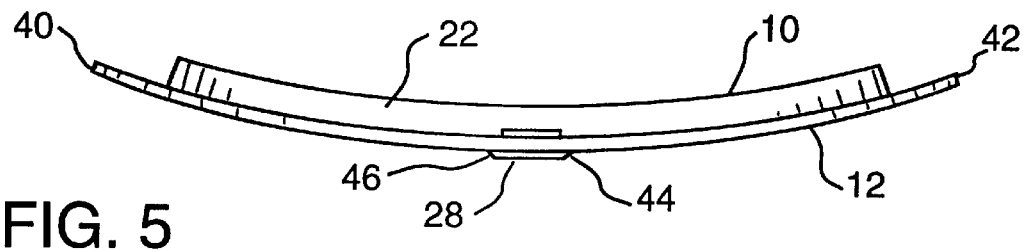
FIG. 5 shows an end section view of the furniture slide on FIGS. 1, 2, 3, and 4.

Shown in FIG. 5 is an in view of the furniture slide 10 according to the present invention having the flexible material 12 forming the bottom face of the furniture side 10 and a compressible material 22 forming the opposing and upper face of the furniture slide 10. From the edges shown at 40 and 42 it can be seen that the cross section of the furniture slide 10 is arcuate in nature and that the rubber grommet shown at 28 has rounded edges 44 and 46 so as not to snag on any carpet or other material over which it may slide.

Figure 6:
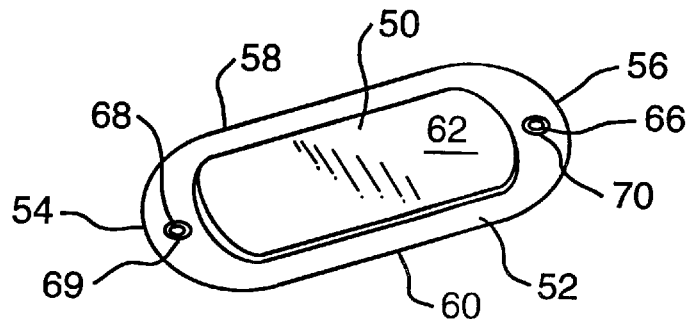
FIG. 6 shows a perspective a view of the natural embodiment of the furniture slide according to the present invention.

FIG. 6 shows an alternate embodiment of the furniture slide 10 according to the present invention. In this case furniture slide 50 again is formed of a elongate flexible material 52 with opposing ends 54 and 56 on body 52. Sidewalls 58 and 60 join the opposing ends 54 and 56. Located on the flexible body of material 52 is a compressible material 62 upon which the furniture of object to be moved will be supported. The opposing ends 54 and 56 each have a perforation 64 and 66 respectively formed therein so that a rope or other pulling mechanism may be fitted through the perforations 64 and 66 in order to move the furniture slide when it is located between the piece of furniture or object (not shown) and the flooring area (also not shown). Preferable grommets 68 and 70 reinforce the perforations 64 and 66 so that the flexible material of 52 will not be torn during the moving operation.

Figure 7:
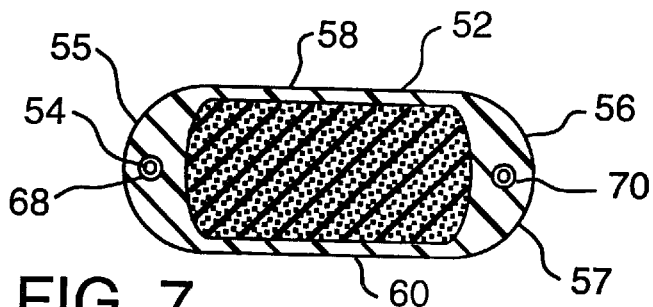
FIG. 7 shows a plan view of the top face of the alternate embodiment of the furniture slide according to the present invention.

Shown more clearly in FIG. 7 is the elongate body 52 having the opposing ends 54 and 56 with the grommet materials 68 and 70 shown more clearly therein. The ends 54 and 56 are preferably formed in arcuate sections such as at 55 and 57 so that the arcuate sections join the sidewalls 58 and 60 of the furniture slide 50. The preferred dimensions are that the elongate body is 11½ inches long and 6½ inches wide.

Figure 8:
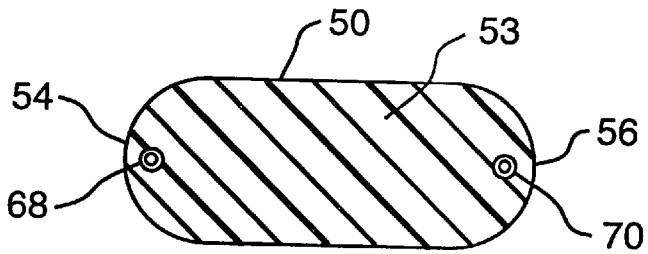
FIG. 8 shows a plan view of the bottom face of the alternate embodiment of the furniture slide according to the present invention.

Shown in FIG. 8 is the furniture slide 50 with the ends 54 and 56 showing the grommets 68 and 70 that extend through perforations 64 and 66 shown in FIG. 6. As has been stated earlier the material 52 is a flexible material and has a bottom face 53 which is facing outwardly of the page and is adapted to abut and slide along a floor surface.

Figure 9:
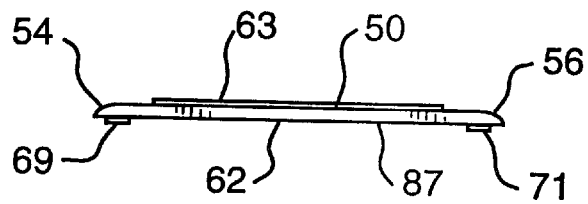
FIG. 9 shows a side view of the alternate embodiment of the furniture slide according to the present invention.

Shown even more clearly in FIG. 9 is the furniture slide 50 having the underlining flexible material 52 supporting the compressible material 62. The compressible material 62 extends throughout the intermediate section 63 of the body of material 52 and stops just short of the opposing ends 54 and 56. The bottom of the rubber grommets 69 and 71 are shown extending below the lower most face 87 of the furniture slide 50 and the rubber grommets will be rounded in such a fashion that they will not catch on any carpet or other material over which they may be sliding.

Figure 10:
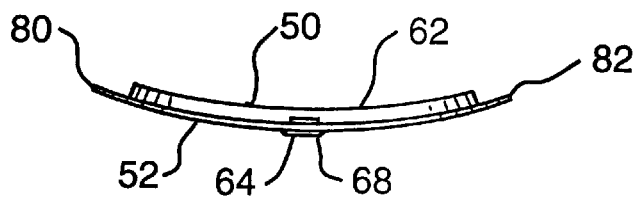
FIG. 10 shows a plan view of the alternate embodiment of the furniture slide according to the present invention.

Shown in FIG. 10 is an in view of the furniture slide 50 according to the present invention having the flexible material 52 forming the bottom face of the furniture slide 50 and a compressible material 62 forming the opposing an upper face of the furniture slide 50. From the edges shown at 80 and 82 it can be seen that the cross section of the furniture slide 50 is arcuate in nature and that the rubber grommet shown at 68 has rounded edges 84 and 86 so as not to snag on any carpet or other material over which it may slide.

The grommets 68 and 70 that go in the perforations are preferably formed with a grommet that is described in U.S. Pat. No. 3,099,057. The contoured no-scratch vinyl grommet prevents damage to any floor surface and allows the attachment of ropes when applying force for moving the furniture.

The present invention has the advantage that the curved ends of the furniture slides deflect rather than gouge walls, rug surfaces, or baseboard surfaces. Further, the thick durable rubber supports that are located on top of the furniture slide supports flat bottomed furniture above the carpet to reduce drag and prevent distortion to the plastic bottom caused by heavy furniture. The arced bottom of the furniture slide allows the furniture to be easily moved in any direction.

Figure 11:
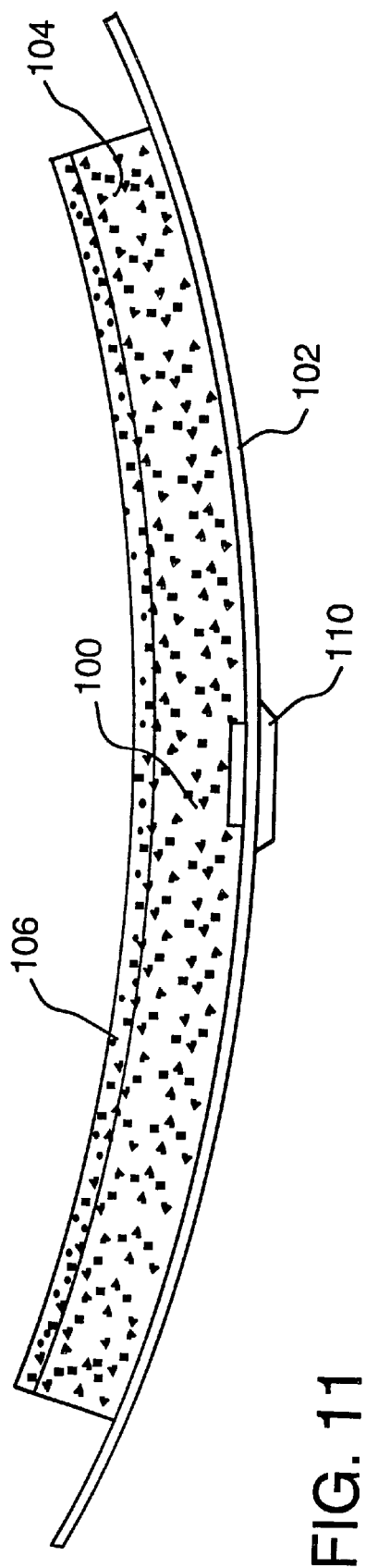
FIG. 11 shows a plan view of still another embodiment of the furniture slide according to the present invention.

What is shown in FIG. 11 is again a furniture slide 100 having a flexible bottom material 102, a compressible upper body portion 104 and a upper layer material 106 comprising a softer rubber material to grip the furniture better. In FIG. 11 a grommet 110 is placed in one end of the furniture slide 100 which is again according to the U.S. Pat. No. 3,099,057 the furniture slide 100 shown in FIG. 11 may be of either the varieties shown in FIGS. 1–5 or 6–10.

Figure 13:
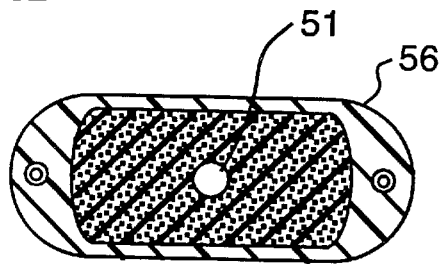
FIG. 13 is a plan view of the embodiment of the invention of FIG. 12.
Figure 14:
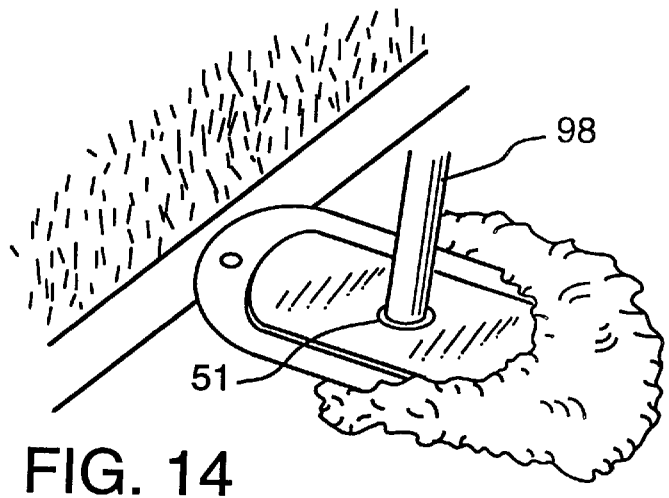
FIG. 14 is a plan view of an alternate embodiment of the present invention.

What is shown in FIGS. 12 and 13 is again a furniture slide as is shown in FIGS. 6–10, but in this case a center hole 51 is formed in the compressible material 62 so that a leg of furniture 98 may be placed therein such as shown in FIG. 14.

Figure 15:
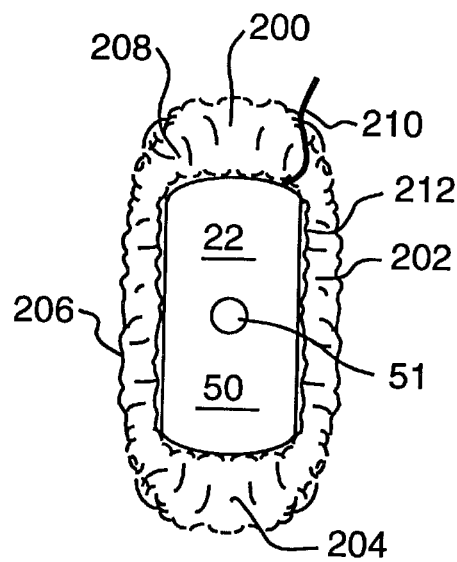
FIG. 15 is a plan view of a furniture slide and cover according to the present invention.

What is shown in FIG. 15 is a furniture slide 50 that is enclosed in a cloth cover shown at 200. The cloth cover 200 is made in a sack-like structure having an upper perimeter 202 that is used to extend over the uppermost portion of the flexible body 52 of the furniture slide 50 while the four sides of the cover 202, 204, 206 and 208 overlap on the upper portion of the flexible material 22. A drawstring 210 may be used to close the cover and hold it tight on the flexible slide 50, or an elastic band 212 may be used to automatically pull the upper sections 202, 204, 206 and 208 toward the center of the upper portion of the furniture slide 50.

Figure 16:
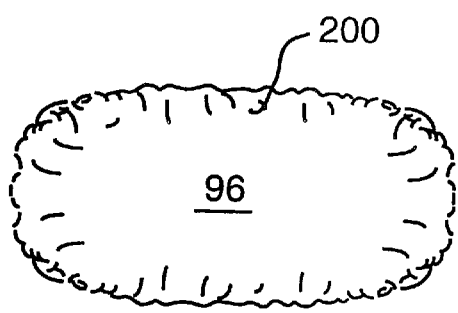
FIG. 16 is a plan view of the furniture slide and cover according to the present invention.

FIG. 16 shows a bottom portion 96 of the cover 200.

Figure 17:
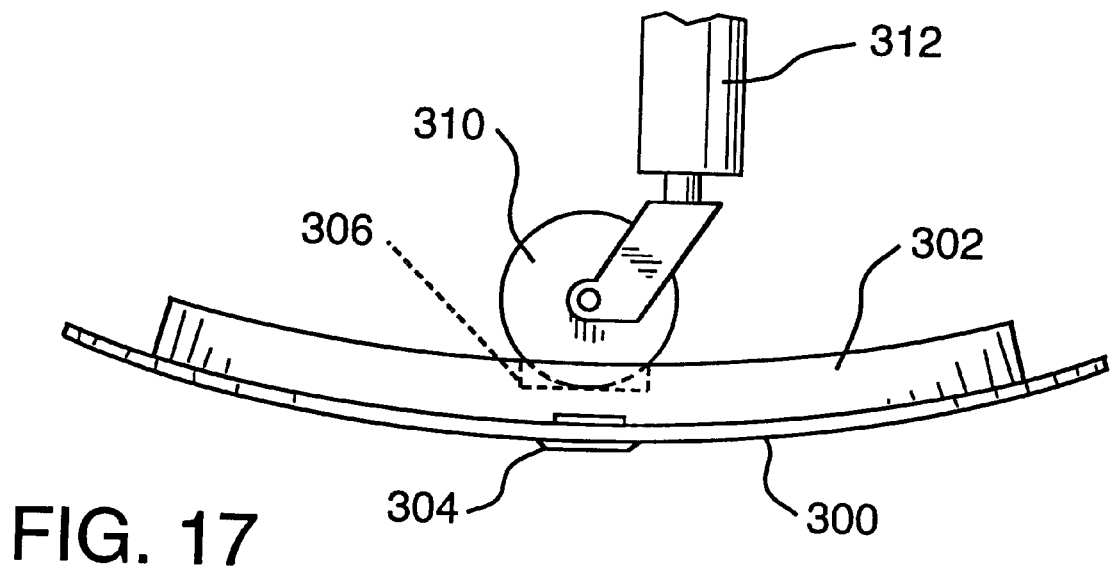
FIG. 17 is a side view of a furniture slide according to the present invention.

What is shown in FIG. 17 is a furniture slide 300 having a compressible material 302 and a grommet 304. A center hole 306 in the compressible 302 extends partway down the thickness of compressible material 302 so as to accommodate the roller 310 which may be attached to a leg 312 of furniture.

Figure 12:
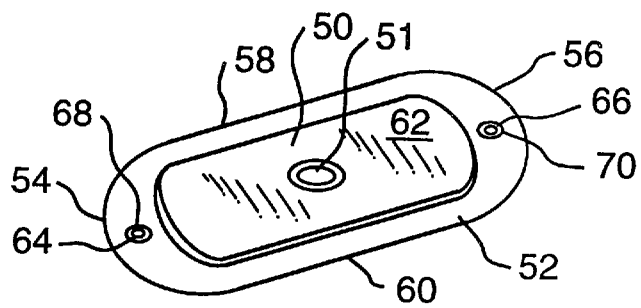
FIG. 12 is a perspective view of another embodiment of the present invention.

What is shown in FIG. 12 is a furniture slide 50 according to the present invention, but having a center hole 51 formed in the top surface so that a furniture leg having a roller thereon which will be engaged by the center hole so that the furniture may not slip out of contact with the furniture slide.

Shown in FIG. 13 is a plan view of the furniture slide 50 having the hole 51. The hole 51 is preferably ¾ of an inch wide by at least a ¼ of an inch deep to allow the hole to engage a roller of a furniture leg.

Shown in FIG. 14 is a plan view of a cover for a furniture slide 50. The cover 200 is rectangular in nature having a bottom portion as shown in FIGS. 16 that completely covers the reduced friction surface of the furniture slide 50. Overlapping edges 202, 204, 206 and 208 come up and extend over the frictional surface or rubber surface 22 of the furniture slide 50 and a drawstring 210 is extended through an interior loop 212 formed in the portions 202, 204, 206 and 208 that extend over the upper surface of the furniture slide 50. Pulling the drawstring together pulls the overlapping portions 202, 204, 206 and 208 towards one another so that the cover 200 is securely engaged to the furniture slide 50 and at the same time allowing the frictional surface 22 to engage the furniture to be moved. Center hole 51 is optional in the furniture slide 50.

Various features of the invention have been particularly shown and described in connection with the illustrated embodiments of the invention, however, it must be understood that these particular arrangements merely illustrate, and that the invention is to be given its fullest interpretation in the terms of the claims.

We claim:

1. A slide for placement between an object to be moved and the flooring over which it is to be moved which comprises:
   a. an elongated sheet of flexible material having opposing ends and side walls joining said opposing ends when viewed in plan;
   b. said sheet having opposing faces when viewed in side with one of said faces for abutting support and sliding contact with a floor surface and the other face having a compressible material fixed thereon with an abutting support contact surface for an object to be moved, said contact surface being the uppermost surface of said slide; said sheet having a concave configuration toward said furniture to be moved;
   c. means formed on said elongate sheet of material for applying force for movement of said slide.

2. The slide according to claim 1 which further comprises said ends being substantially arcuate in configuration from side wall to side wall.

3. The slide according to claim 2 in which said sheet of material comprises a plastic material.

4. The slide according to claim 3 in which said compressible material comprises a rubber material.

5. The slide according to claim 3 in which said plastic material comprises a high density polyethylene material.

6. The slide according to claim 1 which further comprises said sheet of flexible material having a substantial arcuate configuration in cross section when viewed from end view.

7. The slide according to claim 4 in which said rubber material comprises a closed foam construction with a hardness greater than 75 durometers on the shore 00 scale.

8. The slide according to claim 1 in which the thickness of the compressible material is a minimum/of ½ inch thick.

9. The slide according to claim 1 an which said means for applying force to said slide comprises perforations formed in the ends of said sheet of flexible material.

10. The slide according to claim 9 which further comprises grommets re-enforcing said perforations.

11. The slide according to claim 8 which further comprises a blind hole in said compressible material for engagement with the furniture to be moved.

12. A slide for placement between an object to be moved and the flooring over which it is to be moved which comprises:
   a. an elongate sheet of flexible material having opposing ends and side walls joining said opposing ends when viewed in plan;
   b. said sheet having opposing faces when viewed in side with one of said faces for abutting support and sliding contact with a floor surface and the other face having a compressible material fixed thereon for an abutting support contact with an object to be moved;
   c. means formed on said elongate sheet of material for applying force for movement of said slide;
   d. a cloth cover for fitting over the reduced friction surface and having means for attachment to said furniture slide.

13. The furniture slide according to claim 12 in which said means for attaching to said furniture slide comprises said cover having overlapping parts extending over said friction engaging surface and a draw string to pull said overlapping edges towards one another to securely hold said cover on said furniture slide.

* * * * *